W. WITT.
Animal-Trap.

No. 215,308.  Patented May 13, 1879.

Witnesses.
Ernst Jebsen
Emil H. Brunmann

Inventor.
William Witt
By Wm H Lotz
Attorney

UNITED STATES PATENT OFFICE.

WILLIAM WITT, OF BISMARCK, COLORADO.

IMPROVEMENT IN ANIMAL-TRAPS.

Specification forming part of Letters Patent No. 215,308, dated May 13, 1879; application filed February 7, 1879.

*To all whom it may concern:*

Be it known that I, WILLIAM WITT, of Bismarck, in the county of Saguache and State of Colorado, have invented a new and useful Improvement in Animal-Traps; and that the following is a full, clear, and exact description thereof, which will enable others to make and use the same, reference being had to the accompanying drawings, forming part of this specification.

The nature of my invention relates to animal-traps arranged with a falling cage; and my invention consists in the peculiar means for supporting the cage above the platform and releasing the cage, whereby the trap can be easily and readily set from the outside of the cage, and the cage will drop upon the least disturbance of the bait from any point, such means being a number of thimbles with flat ends, arranged between the platform and cage upon a cord, which is secured to the platform and passes upwardly through the cage, so that by straightening the cord the thimbles will be brought in line and the cage supported. The bait-hook is attached to the cord, and any disturbance of this hook will break the column of thimbles and allow the cage to drop.

Figure 1:
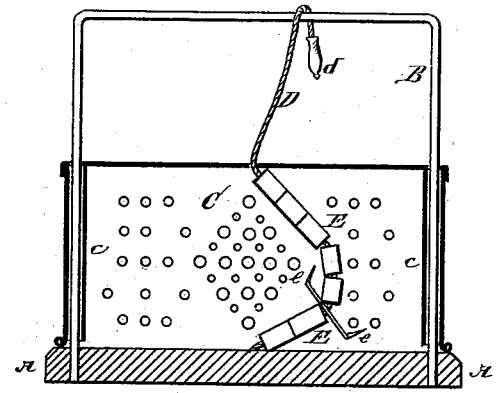
Figure 2:
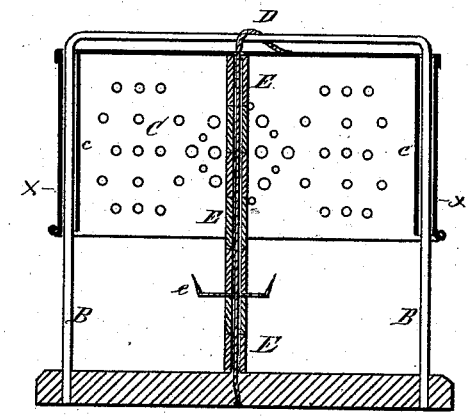
Figure 3:
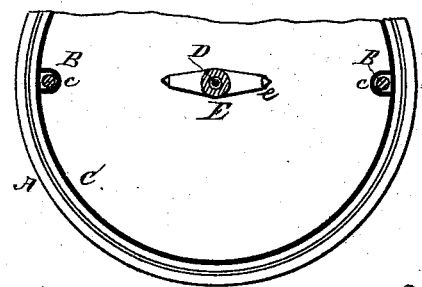

In the drawings, Figure 1 represents a longitudinal vertical section of the trap in the position after capturing an animal. Fig. 2 represents a similar section with the cage in its suspended position; and Fig. 3 represents a sectional plan of the trap on line $x$ $x$ in Fig. 2.

Like letters in the several figures of the drawings indicate like parts.

A is the platform, upon which is secured a gallows-shaped frame, B, preferably bent of a wire or bar, the uprights of which form the guides for the cylindrical cage C, having an open bottom and being closed at the top, and being either made of perforated sheet metal or woven wire, with vertical tubes $c$ formed to its internal rim diametrically opposite, through which the uprights of the frame B are passed, so as to slide thereon and to be guided vertically in line therewith. Upon the center of the platform A is secured the end of a cord, D, the opposite end of which is passed through a central hole in the top of the cage C, and its extremity is provided with a wooden handle, $d$. Upon this cord D, between the platform A and the top of cage C, are strung a series of short wooden thimbles, E, being cylindrical with square ends and of equal diameter, which, when brought to a straight line, will form a continuous column of sufficient height for sustaining the cage in its most elevated position, and between two of such thimbles is interposed a double bait-hook, $e$, a slight pull on which will deflect the column of thimbles sufficiently to cause its yielding to the weight of the cage, which at once will drop and will capture the animal underneath.

For resetting the trap the cord D only needs to be stretched, so as to raise the cage and to bring the thimbles in a straight line with each other again, when it is ready at once for the capture of another animal.

As will be seen, this trap is very simple in its construction and operation, and requires no tedious adjustment for setting, so that a child can attend it.

I am aware that it is not new to construct an animal-trap with a dropping cage sliding on a bail above a platform, and I am also aware that such a cage has been supported by a jointed rod placed between the cage and platform, so that the disturbance of the bait will break the support to the cage and allow it to drop; and I do not claim any of those devices, but only my particular means for setting the trap, which can be more easily and quickly adjusted than the devices used heretofore.

What I claim as my invention is—

In an animal-trap, the combination, with the platform and dropping cage, of a cord, D, carrying the bait-hook and secured to the platform, and passing upwardly through the cage, and the thimbles E, strung upon the cord between the cage and platform, whereby the straightening of the cord will raise the cage and set the column of thimbles, substantially as described and shown.

WILLIAM WITT.

Witnesses:
JOHN BOAZ,
AUG. WITT.